US012624747B2

(12) United States Patent
Sessions

(10) Patent No.: US 12,624,747 B2
(45) Date of Patent: May 12, 2026

(54) ANNULAR PULLEY SYSTEM

(71) Applicant: Liftwave, Inc., Somerville, MA (US)

(72) Inventor: Blake Sessions, Boston, MA (US)

(73) Assignee: Liftwave, Inc., Somerville, MA (US)

( * ) Notice: Subject to any disclaimer, the term of this patent is extended or adjusted under 35 U.S.C. 154(b) by 0 days.

(21) Appl. No.: 18/999,201

(22) Filed: Dec. 23, 2024

(65) Prior Publication Data

US 2025/0122923 A1 Apr. 17, 2025

Related U.S. Application Data

(62) Division of application No. 18/196,019, filed on May 11, 2023, now Pat. No. 12,209,641.

(51) Int. Cl.
*F16H 19/06* (2006.01)
(52) U.S. Cl.
CPC ..................................... *F16H 19/06* (2013.01)
(58) Field of Classification Search
CPC ............. F16H 19/06; F16H 2019/0668; F16H 19/0618; B62D 1/02
See application file for complete search history.

(56) References Cited

U.S. PATENT DOCUMENTS

| | | | |
|---|---|---|---|
| 3,044,312 A | 7/1962 | Hall et al. | |
| 8,714,524 B2 | 5/2014 | Bacon | |
| 11,255,416 B2 * | 2/2022 | Sessions | ............... F16H 19/025 |
| 12,000,415 B1 | 6/2024 | Sessions | |

| | | |
|---|---|---|
| 2007/0219031 A1 | 9/2007 | Jones |
| 2013/0255410 A1 | 10/2013 | Lee et al. |
| 2020/0256436 A1 | 8/2020 | Sessions |
| 2021/0404537 A1 | 12/2021 | Sessions |

FOREIGN PATENT DOCUMENTS

| | | |
|---|---|---|
| EP | 3679275 B1 | 11/2022 |
| WO | WO 2022/140374 A1 | 6/2022 |

OTHER PUBLICATIONS

International Search Report and Written Opinion in International Appln. No. PCT/US2024/028589, mailed on Aug. 1, 2024, 17 pages.

* cited by examiner

*Primary Examiner* — Jake Cook
(74) *Attorney, Agent, or Firm* — Fish & Richardson P.C.

(57) ABSTRACT

In general, this disclosure involves a pulley system that includes a plurality of fixed sheaves arranged in a first annulus and a plurality of traveling sheaves arranged in a second annulus. The plurality of traveling sheaves are configured to travel along an axis of travel and are coupled to an output shaft configured to pass through the first annulus and translate along the axis of travel. The plurality of traveling sheaves are aligned with the plurality of fixed sheaves such that at least half of a plurality of spans between the plurality of traveling sheaves and the plurality of fixed sheaves are parallel spans that are parallel with the axis of travel. A flat belt extends between and around the plurality of fixed sheaves and the plurality of traveling sheaves, the flat belt including a plurality of twists along the parallel spans to form a plurality of twisted spans.

7 Claims, 6 Drawing Sheets

Drive Motor
*102*

Belt
*104*

Output Shaft
*106*

Linear Actuator
*100*

Output Shaft
106

Linear Actuator
100

Belt
104

Drive Motor
102

Output Shaft
106

Linear Actuator
100

Belt
104

Drive Motor
102

Traveling Sheave Group
402

Fixed Sheave Group
404

400

Twisted Span
408C

Twisted Span
408D

Twisted Span
408A

Twisted Span
408B

Alignment
Span
410

Redirection
Sheaves
412

Axis of Travel
406

Redirection Sheaves 412

Output Shaft 106

Fold Axes 502

Fold Axes 502

Fold Axes 502

400

ANNULAR PULLEY SYSTEM

CROSS REFERENCE TO RELATED APPLICATION

This application is a divisional of U.S. patent application Ser. No. 18/196,019 filed May 11, 2023, the entire content of which application is hereby incorporated by reference in its entirety.

TECHNICAL FIELD

This disclosure generally relates to a pulley system arranged in an annular configuration. This pulley system can be used in electric linear actuators.

BACKGROUND

Modern belts have many desirable characteristics. They can be lightweight, low-maintenance, and have high strength under tension. Many new and old applications of modern belts are currently being adapted.

SUMMARY

In general, the disclosure involves a pulley system that includes a plurality of fixed sheaves arranged in a first annulus and a plurality of traveling sheaves arranged in a second annulus. The plurality of traveling sheaves are configured to travel along an axis of travel and are coupled to an output shaft configured to pass through the first annulus and translate along the axis of travel. The plurality of traveling sheaves are aligned with the plurality of fixed sheaves such that at least half of a plurality of spans between the plurality of traveling sheaves and the plurality of fixed sheaves are parallel spans that are parallel with the axis of travel. A flat belt extends between and around the plurality of fixed sheaves and the plurality of traveling sheaves, the flat belt including a plurality of twists along the parallel spans to form a plurality of twisted spans.

Implementations can optionally include one or more of the following features.

In some instances, the plurality of fixed sheaves includes four sheaves and the plurality of traveling sheaves includes five sheaves.

In some instances, each twisted span of the plurality of twisted spans is twisted by 72±10 degrees.

In some instances, the plurality of spans between the plurality of traveling sheaves and the plurality of fixed sheaves comprises eight spans.

In some instances, the plurality of fixed sheaves are coupled to a common structure that is a component of a linear actuator.

In some instances, a subset of the plurality of spans between the plurality of traveling sheaves and the plurality of fixed sheaves are alignment spans, aligned in paired sets with symmetric angles with respect to the axis of travel to minimize torque applied to the output shaft generated by belt tension. In some instances, the plurality of spans includes four parallel spans and four alignment spans. The four alignment spans include two alignment spans that oppose rotation in a first direction about the axis of travel and two alignment spans that oppose rotation in a second direction about the axis of travel.

This disclosure further describes a belt driven linear actuator that includes a support structure, and output shaft, a first pulley system, a second pulley system, and a belt drive mechanism. The first pulley system includes a first plurality of sheaves coupled to the support structure, a second plurality of sheaves coupled to the output shaft, and a flat belt extending between and around the first plurality of sheaves and the second plurality of sheaves with a predetermined number of free spans between them, and out of the first pulley system. The first pulley system is configured such that removing belt from the first pulley system causes the second plurality of sheaves to translate the output shaft along an axis of travel in a contracting direction. The second pulley system includes a third plurality of sheaves arranged in an annular configuration and coupled to the support structure, the third plurality of sheaves at least partially surrounding the output shaft. The second pulley system includes a fourth plurality of sheaves arranged in an annular configuration and coupled to the output shaft, the fourth plurality of sheaves a least partially surrounding the output shaft. The flat belt extends between and around the third plurality of sheaves and the fourth plurality of sheaves with the predetermined number of free spans between them. The second pulley system is configured such that removing belt from the second pulley system causes the fourth plurality of sheaves to translate the output shaft along the axis of travel in an expanding direction. The belt drive mechanism is configured to transfer belt between the first pulley system and the second pulley system.

In some instances, the third plurality of sheaves includes four sheaves and the fourth plurality of sheaves includes five sheaves.

In some instances, the flat belt passing between the third plurality of sheaves and the fourth plurality of sheaves forms a plurality of spans, and at least half of the plurality of spans are parallel spans aligned in parallel with the axis of travel, and a subset of the plurality spans are alignment spans, aligned to oppose rotation about the axis of travel. In some instances, the plurality of spans includes four parallel spans and four spans alignment spans, and the four alignment spans comprises two alignment spans configured to oppose rotation in a first direction about the axis of travel and two alignment spans configured to oppose rotation in a second direction about the axis of travel. In some instances, each parallel span comprises a twist of 72±10 degrees.

In some instances, the belt drive mechanism includes a capstan, and the flat belt extends from a first anchor point, through the first pulley system, about the capstan, through the second pulley system, and to a second anchor point. In some instances, the capstan is operated by an electric motor.

The disclosed annular pulley system enables a belt-driven linear actuator to operate in a dual action mode (e.g., both expand and contract). This is accomplished while maintaining a similar form factor to conventional hydraulic actuators. In addition to being space efficient, the annular configuration maximizes the range of travel, and can be relatively low maintenance as compared to conventional linear actuators. Further, with the annular pulley configuration, an electric actuator is able to regenerate or recoup electrical energy in both directions of actuator travel.

This disclosure describes an annular pulley system that enables "expansion" of a linear actuator, and is configured to fit around the output shaft of that linear actuator. Belt driven systems can have many advantages over other similar systems. For example, a belt driven linear actuator can require less maintenance, be lighter weight, and be capable of more cycles than a similar hydraulic linear actuator. Further the belt driven system, when operated by an electric motor is capable of recouping energy during some movement events (e.g., lowering a load). Many belt drive mechanisms include a capstan, which can receive one or more turns or partial turns of a belt and provide rotational force to draw/take in or pay out the belt. The capstan can be powered by, for example, an electric motor via a set of reduction gears or a hydraulic motor, among other things. The belt can be drawn/taken in or payed out to and from various pulley systems within the linear actuator. For example, a double action linear actuator may operate in an "expanding" mode, where belt is extracted from an expanding system and payed out to a contracting system. This same linear actuator may also operate in a "contracting" mode, where belt is extracted from the contracting system and payed out to the expanding system.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

To describe technical solutions in the implementations of the present specification or in the existing technology more clearly, the following briefly describes the accompanying drawings needed for describing the implementations or the existing technology. Apparently, the accompanying drawings in the following descriptions merely show some implementations of the present specification, and a person of ordinary skill in the art can still derive other drawings from these accompanying drawings without creative efforts.

Like reference numbers and designations in the various drawings indicate like elements.

DETAILED DESCRIPTION

This disclosure describes an annular pulley system which can be used to enable two way or double action movement of a belt-driven linear actuator.

To help a person skilled in the art better understand the technical solutions in the present specification, the following clearly and comprehensively describes the technical solutions in the implementations of the present specification with reference to the accompanying drawings in the implementations of the present specification. Apparently, the described implementations are merely some rather than all of the implementations of the present specification. All other implementations obtained by a person of ordinary skill in the art based on one or more implementations of the present specification without creative efforts shall fall within the protection scope of the implementations of the present specification.

Figures 1A, 1B:
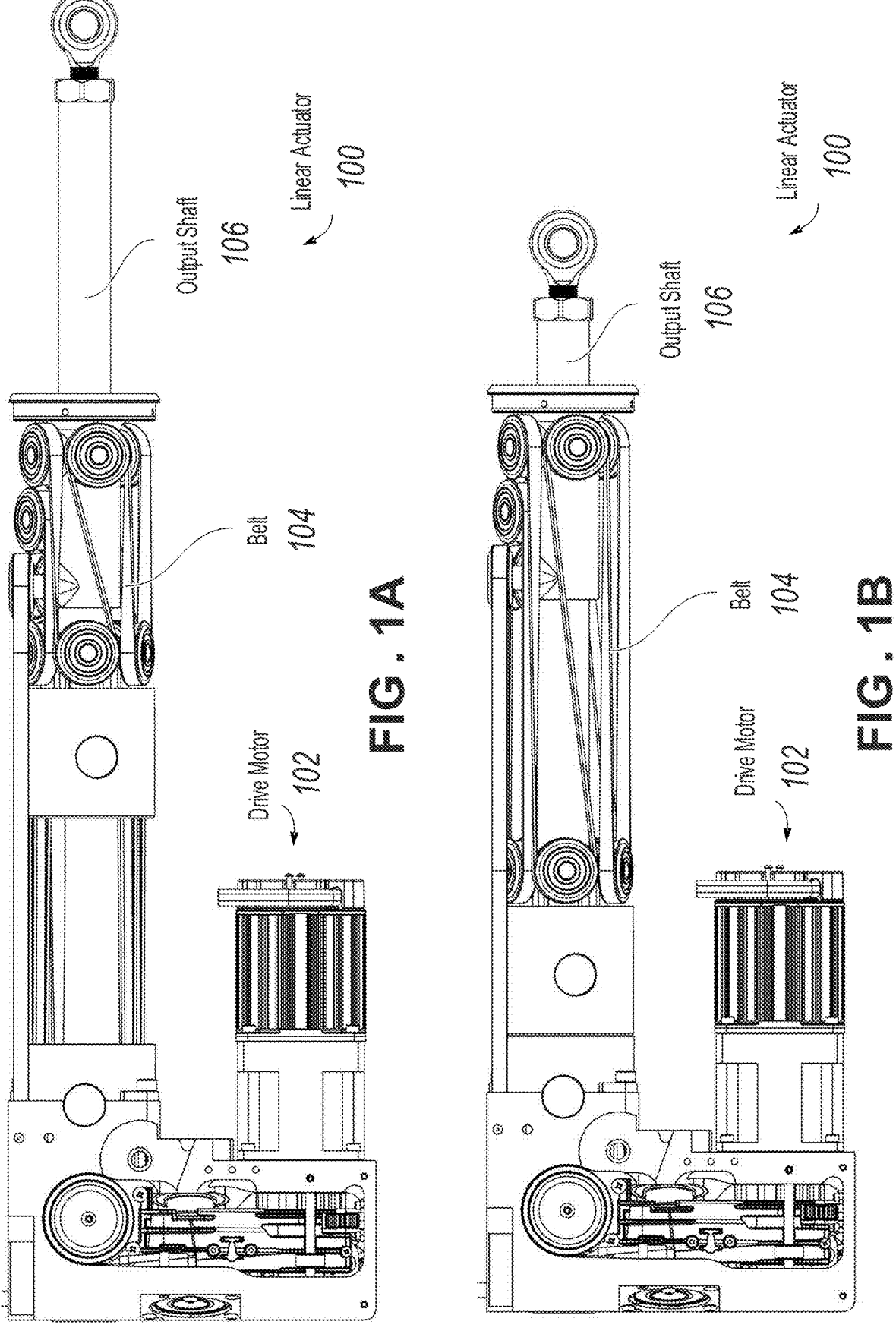
FIG. 1A depicts a side view of a linear actuator that includes an annular pulley system in an expanded configuration.
FIG. 1B depicts a side view of a linear actuator that includes an annular pulley system in a contracted configuration.

FIG. 1A depicts a side view of a linear actuator 100 that includes an annular pulley system in an expanded configuration. Linear actuator 100 includes a drive motor 102 that operates a belt 104 to expand or contract, translating an output shaft 106 accordingly. Linear actuator 100 includes two pulley systems (discussed in more detail below) which operate as an opposed pair, with one system pulling output shaft 106 in the contracting direction (to the left in FIGS. 1A and 1B, and the other system pulling output shaft 106 in the expanding direction (to the right in FIGS. 1A and 1B).

FIG. 1B depicts a side view of linear actuator 100 with the annular pulley system in a contracted configuration. In FIG. 1B, belt 104 has been payed out of the contracting pulley system and into the expanding pulley system, and output shaft 106 has been translated to the left.

Belt 104 can be a high strength, belt formed from two or more wire ropes run in a parallel arrangement and jacketed in a polyurethane or other sheath material. This can enable high strength, and high durability belt that can withstand sufficient bend stresses in order to enable the use of relatively low diameter sheaves. In some implementations, the wire ropes within belt 104 can be pre-tensioned in a non-uniform manner to increase the twist and fleet angle tolerance of the belt 104.

Figure 2:
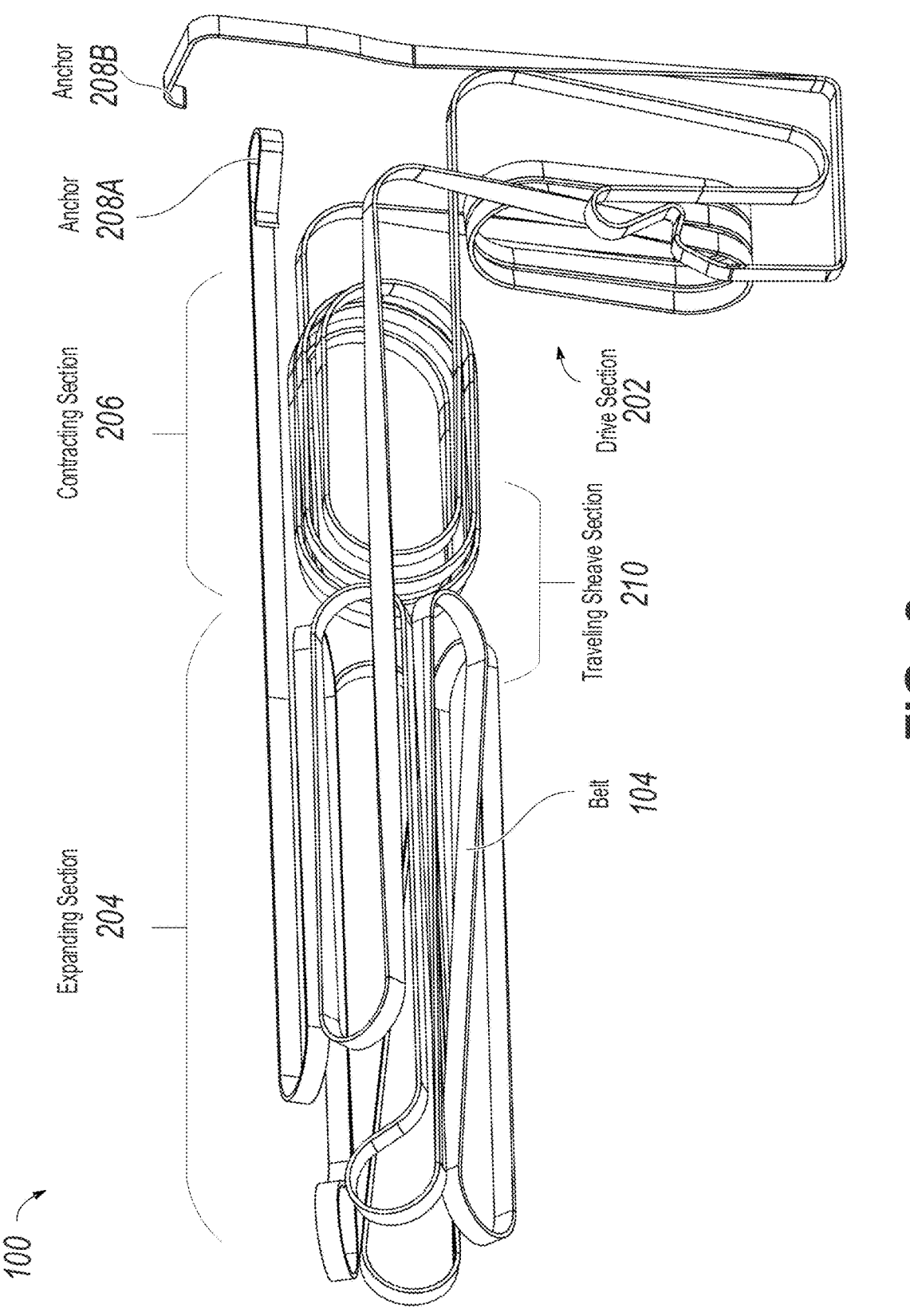
FIG. 2 depicts a perspective view of the belt configuration in the linear actuator of FIGS. 1A and 1B.

FIG. 2 depicts a perspective view of the belt configuration in linear actuator 100 of FIGS. 1A and 1B. The belt 104 passes from anchor 208A, through expanding section 204, through drive section 202, through contracting section 206, and terminates at anchor 208B. Drive section 202 can include a capstan, or other mechanism that transfers belt 104 between the opposed expanding section 204 and contracting section 206. That is, when drive section 202 pulls or extracts belt 104 from expanding section 204, it simultaneously pays out belt 104 into contracting section 206. Similarly, when drive section 202 extracts belt 104 from contracting section 206, it pays out belt 104 to expanding section 204.

In the example illustrated in FIG. 2, both expanding section 204 and contracting section 206 include the same number of spans between their respective moving sheaves and fixed sheaves, resulting in the same reduction ratio for each section (10:1 in the illustrated example). This ensures that as belt 104 is removed from one section (e.g., expanding section 204), the same amount of belt 104 is required or consumed by the other section (e.g., contracting section 206). Thus the entirety of belt 104 can remain in tension through the full range of motion of the linear actuator 100.

In some implementations, two separate belts, driven by two separate drive systems can be employed. For example, expanding section 204 may have an independent belt and drive system. Similarly contracting section 206 may use a separate belt and drive system.

In the example illustrated in FIG. 2, the output of the linear actuator 100 (e.g., output shaft 106 as illustrated in FIGS. 1A and 1B) is coupled to traveling sheaves in traveling sheave section 210 near the center of the linear actuator 100. Output shaft 106 is generally concentric with an approximately cylindrical form factor of pulley sections (204 and 206) of linear actuator 100. Thus in order to enable output shaft 106 to extend from traveling sheave section 210 out of the device, it must pass through expanding section 204. Therefore, expanding section 204 is arranged in an annular configuration to provide space through which output shaft 106 can extend. It should be noted that an "annular configuration" or "arranged in an annulus" is intended to mean generally ring shaped, but not necessarily a perfect circular shape. For example, the illustrated example includes sheaves arranged in an annulus with a roughly pentagonal shape. In some implementations, expanding section 204 could have a square, triangular, or hexagonal cross section. Or a combination thereof. Other similar shapes and structures are contemplated as within the scope of this disclosure.

FIGS. 3A-3D illustrate example pulley systems with enlarged sheaves and aligned spans to enable twist. FIGS. 3A through 3D illustrate a simplified and "unfolded" two-dimensional example of the annularly configured pulley system of this disclosure.

Figures 3A, 3B, 3C, 3D:
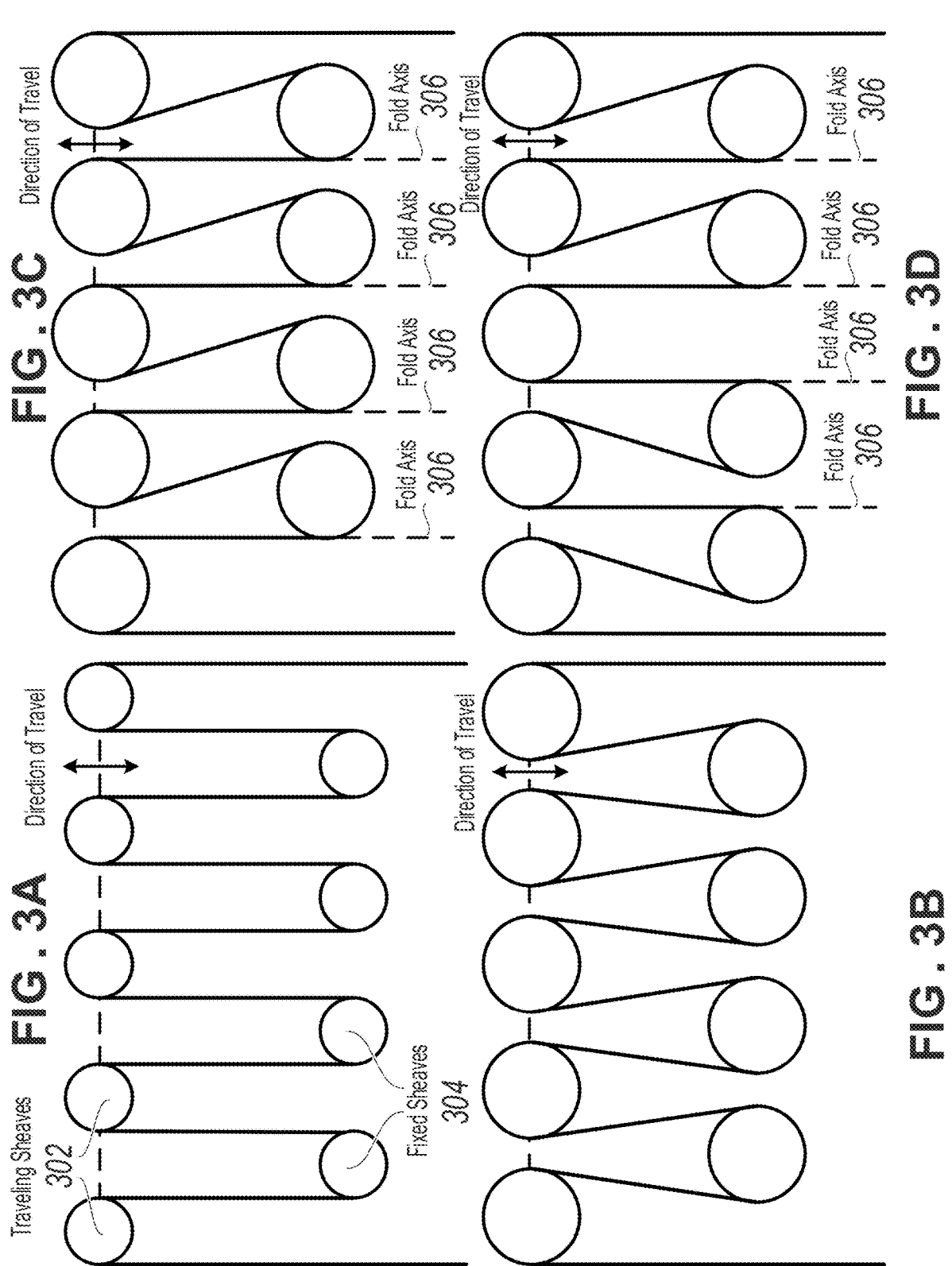
FIGS. 3A-3D illustrate example pulley systems with enlarged sheaves and aligned spans to enable twist.

FIG. 3A illustrates an example simple pulley system with five traveling sheaves 302 near the top, and four fixed sheaves 304 near the bottom. The fixed sheaves 304 can be attached to a support structure, such as an actuator chassis, or other object that prevents movement of the fixed sheaves 304 within the pulley system. The traveling sheaves 302 can be attached traveling components of the pulley system, such as an output shaft of a linear actuator. This configuration results in a 10:1 mechanical advantage as there are ten spans extending from the traveling section. In FIG. 3A each span is parallel, which enables folding of the pulley system along the spans. This folding will result in some number of twisted spans, which can be acceptable if the twist ratio is maintained below a certain amount. Flat belts used in pulley configurations are more sensitive to twisted geometries or sheave misalignment (e.g., fleet angles) than wire rope pulley systems. Twist ratio for a span of belt is generally defined as the length of a free span divided by the belt width for a 90-degree twist. For example, a belt with a 10 mm width and a 300 mm free span that is twisted at 45 degrees would have a twist ratio of 60:1. The twist ratio can be given by the equation $$= \frac{L_{Span}}{W_{belt}} \times \frac{90}{\text{Twist}},$$

where $L_{span}$ is the length of the free span, $W_{belt}$ is the width of the belt, and Twist is the amount of twist in the span in degrees. In some implementations, twist ratios of 20:1 or less result in a reduction in service life of the belt. In some implementations, higher twist ratios (e.g., 12:1, or 15:1, etc.) can be permissible if a compensating fleet angle is introduced. This is further described in U.S. patent application Ser. No. 16/630,109 the contents of which are incorporated herein by reference. While the configuration of FIG. 3A results in parallel spans thus allowing the configuration to be folded into an annular arrangement, the maximum working load is unnecessarily limited by the smaller sheave size.

FIG. 3B illustrates the same pulley system as FIG. 3A with larger sheaves in the same total width. This configuration will have a higher permissible working load, because the bend radius of the belt passing about the sheaves is greater. In many implementations, the maximum working load is limited by the bending stress within the belt as it passes over sheaves. This bending stress, which is generally compressive at each wire's edge within the steel wire rope that is closest to contact point between the belt and the sheave, and tensile along the outer edge of each wire, is a function of the bending radius, or diameter of the sheave. For a given belt thickness, increasing the diameter of the sheave will reduce the bending stress within the belt passing over the sheave, and therefore enable a higher working load. It will also reduce the operating contact pressure between the belt and the sheave. The configuration in FIG. 3B, however, does not include spans that are parallel with the direction of travel of the traveling sheaves 302. If the pulley system of FIG. 3B were "folded" or "rolled" about an axis along the direction of travel of the traveling sheaves, the resulting spans would include both twists and fleet angle misalignment. Further, as the length of the spans changes during operation, the fleet angle and twist ratio would also change. This would result in rapid wear and failure of the belt.

By offsetting one set of sheaves (e.g., the fixed sheaves 304 or the traveling sheaves 302) as illustrated in FIG. 3C, some of the spans can be re-aligned to be parallel with the axis of travel. This creates four fold axes 306 in the illustrated example, about which the pulley system can be twisted. If a 72 degree twist were applied to each of the four spans on the illustrated fold axes 306, the pulley system of FIG. 3C would take on an annular configuration, while maintaining enlarged sheaves and high working load capabilities. The configuration of FIG. 3C, however, results in four non-parallel spans that, when folded, would create a "spiral" configuration of spans in the same direction. That "spiral" would result in a net torque created between the fixed sheaves 304 and the traveling sheaves 302 when the belt is under tension. This net torque is undesirable because it can result in more rapid wear of anti-rotation features that are present along the output shaft, which will eventually cause undesirable belt misalignments and cause premature belt wear.

FIG. 3D provides a torque compensated solution, where half of the fixed sheaves are offset in one direction, and the remaining fixed sheaves are offset in the opposite direction. With this configuration, the non-parallel spans provide self-aligning functionality. That is, if the traveling sheaves rotate or become misaligned about the axis of travel when folded into an annular configuration, the angle of some of the non-parallel spans about the axis of travel will increase, while the angle of the non-parallel spans about the axis of travel in the opposite direction will decrease. This results in a naturally torque compensated, self-aligning system, with a number of parallel spans that enable twisting to create fold axes 306. It should be noted that to "roll" the pulley system of FIG. 3D into an annular configuration, each fold along the fold axes 306 is not necessarily equal. For example, the folds at the two fold axes 306 near the center sheave may be more than 72 degrees (e.g., 78 or 87 degrees), while the two outer fold axes 306 may be less than 72 degrees (e.g., 66 or 62 degrees). In some implementations, there is a 65 degree angle along the two fold axes 306 near the center, and a 72 degree angle at each of the outer fold axes 306 (leaving an 86 degree angle between the centerlines of the outer sheaves of the traveling sheaves 302).

Figure 4:
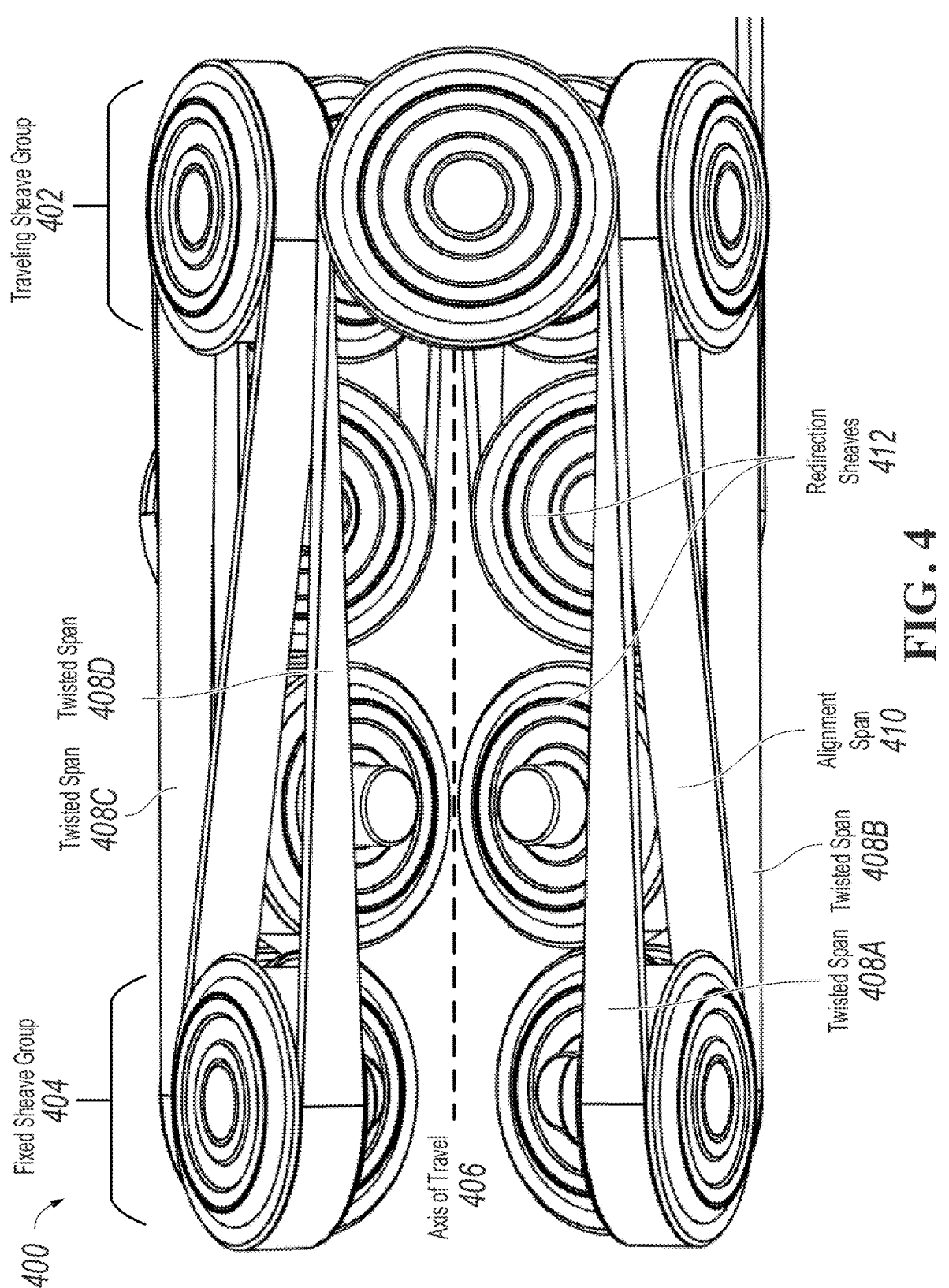
FIG. 4 depicts an annular pulley system.

FIG. 4 depicts an annular pulley system 400. The annular pulley system 400 can have the same, or similar layout as the two dimensional representation in FIG. 3D. Annular pulley system 400 includes a traveling sheave group 402, which has five sheaves in the illustrated example, and is configured to travel along the axis of travel 406, which is up or down in FIG. 4. It should be noted that FIG. 4 illustrates traveling sheave group 402 near the extreme lower limit of travel, where traveling sheave group 402 is close to redirection sheaves 412.

Redirection sheaves 412 are positioned between fixed sheave group 404 and traveling sheave group 402 and direct belt into and out of pulley system 400 while preventing interference between the belt and structural components of system 400.

Traveling sheave group 402 can be mounted about an output shaft such as output shaft 106 (shown in FIGS. 1A and 1B), which can extend through pulley system 400. Fixed sheave group 404, along with redirection sheaves 412 can be mounted to a structure of the linear actuator.

Annular pulley system 400 includes twisted spans 408A-408D, which each share a common centerline alignment between a sheave of traveling sheave group 402 and a sheave of fixed sheave group 404 which is parallel to axis of travel 406. Additional spans in the system 400 can act as alignment spans such as alignment span 410, which works to prevent the traveling sheave group 402 from rotating about axis of travel 406.

Figures 5A, 5B:
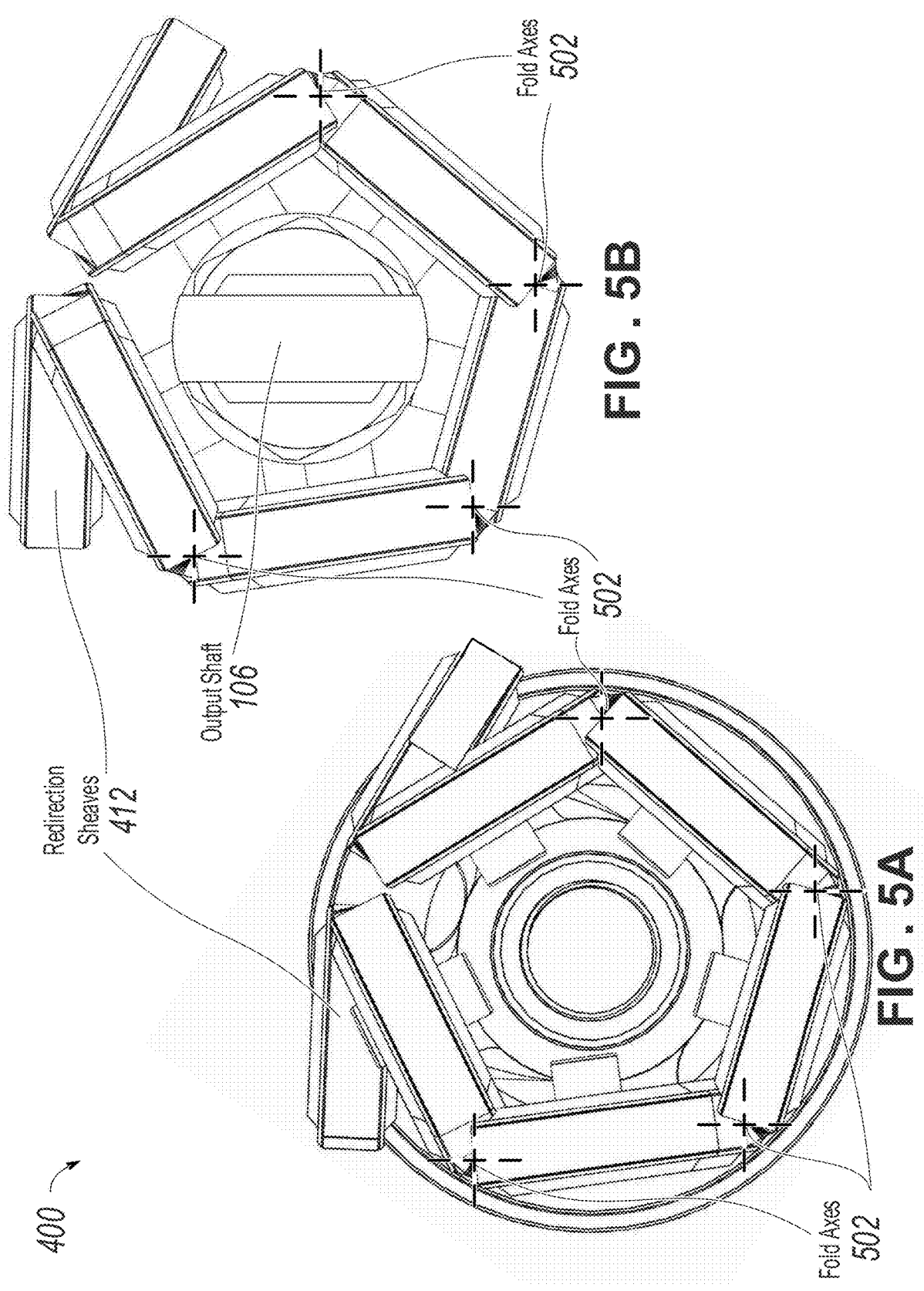
FIGS. 5A and 5B depict a front and rear view of the annular pulley system of FIG. 4.

FIGS. 5A and 5B depict a front and rear view of the annular pulley system of FIG. 4. FIG. 5A illustrates a rear view, with the four fold axes 502 aligning with twisted spans as illustrated in FIG. 4. FIG. 5A illustrates the traveling group arranged in the foreground and the fixed group in the background. FIG. 5B shows the fixed group in the foreground, with the traveling group in the background. Redirection sheaves 412 are used to redirect the belt as it enters or exits the annular pulley system 400.

Figures 6A, 6B:
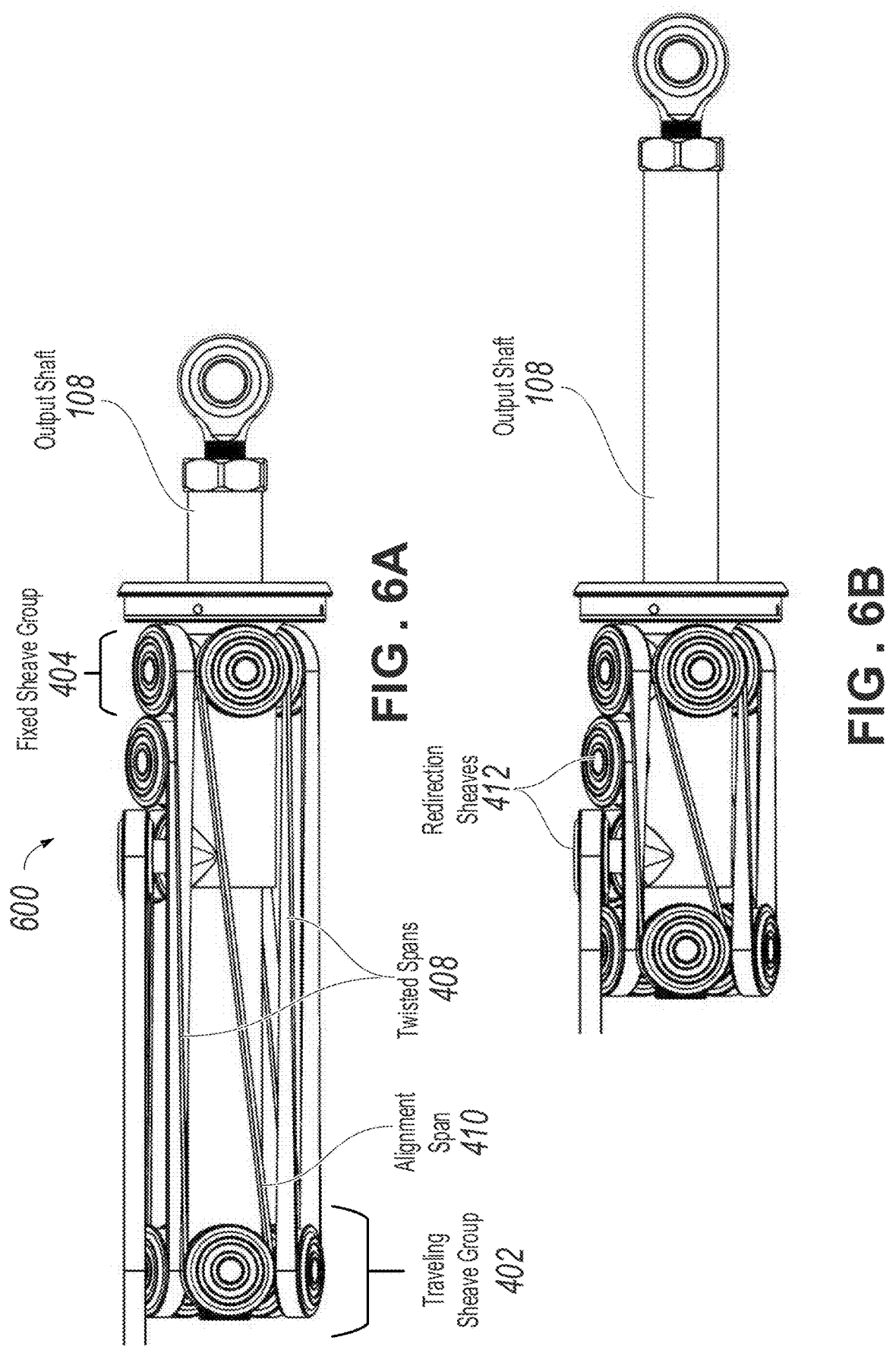
FIG. 6A depicts an annular pulley system coupled with an output shaft in a contracted position.
FIG. 6B depicts an annular pulley system coupled with an output shaft in an expanded position.

FIG. 6A depicts an annular pulley system coupled with an output shaft 108 in a contracted position. In FIG. 6A, the twisted spans 206 and alignment span 410 are shown near their maximum length of travel. The output shaft 108, coupled to the traveling sheave group 402, extends from the traveling sheave group 402, through the center of the fixed sheave group 404 and out of the device. In order for the actuator to achieve an extended configuration as illustrated in FIG. 6B, belt is withdrawn from the pulley system, forcing traveling sheave group 402 rightward in the illustrated implementation, and extending the output shaft 108.

The foregoing description is provided in the context of one or more particular implementations. Various modifications, alterations, and permutations of the disclosed implementations can be made without departing from scope of the disclosure. Thus, the present disclosure is not intended to be limited only to the described or illustrated implementations, but is to be accorded the widest scope consistent with the principles and features disclosed herein.

The invention claimed is:

1. A belt driven linear actuator comprising:
a support structure;
an output shaft;
a first pulley system comprising:
    a first plurality of sheaves coupled to the support structure;
    a second plurality of sheaves coupled to the output shaft; and
    a flat belt extending between and around the first plurality of sheaves and the second plurality of sheaves with a predetermined number of free spans between them, and out of the first pulley system, wherein the first pulley system is configured such that removing belt from the first pulley system causes the second plurality of sheaves to translate the output shaft along an axis of travel in a contracting direction;
a second pulley system comprising:
    a third plurality of sheaves arranged in an annular configuration and coupled to the support structure, wherein the third plurality of sheaves at least partially surround the output shaft;
    a fourth plurality of sheaves arranged in an annular configuration and coupled to the output shaft, wherein the fourth plurality of sheaves at least partially surround the output shaft;
    the flat belt extending between and around the third plurality of sheaves and the fourth plurality of sheaves with the predetermined number of free spans between them, wherein the second pulley system is configured such that removing belt from the second pulley system causes the fourth plurality of sheaves to translate the output shaft along the axis of travel in an expanding direction; and
a belt drive mechanism configured to transfer belt between the first pulley system and the second pulley system.

2. The linear actuator of claim 1, wherein the third plurality of sheaves comprises four sheaves, and wherein the fourth plurality of sheaves comprises five sheaves.

3. The linear actuator of claim 1, wherein the flat belt passing between the third plurality of sheaves and the fourth plurality of sheaves forms a plurality of spans, wherein at least half of the plurality of spans are parallel spans aligned in parallel with the axis of travel, and wherein a subset of the plurality spans are alignment spans, aligned in paired sets with symmetric angles with respect to the axis of travel to minimize torque applied to the output shaft generated by belt tension.

4. The linear actuator of claim 3, wherein at least two of the alignment spans are redirected to be parallel with the axis of travel by at least two redirection sheaves.

5. The linear actuator of claim 4, wherein each parallel span comprises a twist of 72±10 degrees.

6. The linear actuator of claim 1, wherein the belt drive mechanism comprises a capstan, and wherein the flat belt extends from a first anchor point, through the first pulley system, about the capstan, through the second pulley system, and to a second anchor point.

7. The linear actuator of claim 6, wherein the capstan is operated by an electric motor.

* * * * *